United States Patent
Li et al.

(10) Patent No.: US 9,001,759 B2
(45) Date of Patent: Apr. 7, 2015

(54) BASE STATION AND METHOD FOR RESOURCE ALLOCATION IN A 3GPP LTE NETWORK

(75) Inventors: Qinghua Li, Sunnyvale, CA (US); Ozgur Oyman, Palo Alto, CA (US); Wendy C. Wong, San Jose, CA (US); Hujun Yin, San Jose, CA (US); Xintian E Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 13/558,964

(22) Filed: Jul. 26, 2012

(65) Prior Publication Data

US 2012/0287895 A1   Nov. 15, 2012

Related U.S. Application Data

(63) Continuation of application No. 12/169,731, filed on Jul. 9, 2008, now Pat. No. 8,243,690.

(51) Int. Cl.
*H04W 4/00* (2009.01)
*H04L 5/00* (2006.01)

(52) U.S. Cl.
CPC ............ *H04L 5/0053* (2013.01); *H04L 5/0026* (2013.01); *H04L 5/0039* (2013.01); *H04L 5/0094* (2013.01); *H04L 5/0051* (2013.01); *H04L 5/0044* (2013.01); *H04L 5/0062* (2013.01)

(58) Field of Classification Search
None
See application file for complete search history.

(56) References Cited

U.S. PATENT DOCUMENTS

| | | | |
|---|---|---|---|
| 7,751,492 | B2 | 7/2010 | Jalali et al. |
| 8,243,690 | B2 | 8/2012 | Li et al. |
| 2004/0032368 | A1 | 2/2004 | Spittler |
| 2004/0062211 | A1 | 4/2004 | Uhlik |
| 2004/0082356 | A1 | 4/2004 | Walton et al. |
| 2004/0156328 | A1 | 8/2004 | Walton et al. |

(Continued)

FOREIGN PATENT DOCUMENTS

| | | |
|---|---|---|
| CN | 1703847 A | 11/2005 |
| CN | 103326842 A | 9/2013 |

(Continued)

OTHER PUBLICATIONS

Chinese Application Serial No. 200910140170.9, Office Action mailed Sep. 27, 2012, w/English translation, 7 pgs.

(Continued)

*Primary Examiner* — Kouroush Mohebbi
(74) *Attorney, Agent, or Firm* — Schwegman Lundberg & Woessner, P.A.; Eric S. Hiponia

(57) ABSTRACT

Embodiments of a base station and methods for allocating uplink bandwidth using SDMA are generally described herein. In some embodiments, uplink bandwidth request messages are received on a bandwidth request contention channel from one or more subscriber stations. The uplink bandwidth request messages are generated by the subscriber stations by modulating pilot subcarriers of a randomly selected disjoint pilot pattern with a randomly selected orthogonal sequence. The base station allocates uplink bandwidth to the subscriber stations when the uplink bandwidth request messages are successfully detected and decoded. The base station uses an SDMA technique to determine channel responses based on the orthogonal sequences to detect and decode the uplink bandwidth request messages.

19 Claims, 4 Drawing Sheets

SDMA WIRELESS NETWORK

(56) References Cited

U.S. PATENT DOCUMENTS

| | | | |
|---|---|---|---|
| 2006/0035643 A1* | 2/2006 | Vook et al. | 455/450 |
| 2007/0189205 A1* | 8/2007 | Terry et al. | 370/328 |
| 2007/0263579 A1 | 11/2007 | Ozluturk | |
| 2008/0159334 A1 | 7/2008 | Venkatachalam et al. | |
| 2008/0165891 A1 | 7/2008 | Budianu et al. | |
| 2009/0181691 A1 | 7/2009 | Kotecha et al. | |
| 2009/0303978 A1* | 12/2009 | Pajukoski et al. | 370/345 |
| 2009/0316811 A1 | 12/2009 | Maeda et al. | |
| 2010/0002670 A1 | 1/2010 | Dent | |
| 2010/0008318 A1 | 1/2010 | Wentink et al. | |
| 2010/0008331 A1 | 1/2010 | Li et al. | |

FOREIGN PATENT DOCUMENTS

| | | |
|---|---|---|
| JP | 2004503181 A | 1/2004 |
| JP | 2006501770 A | 1/2006 |
| JP | 2006504335 A | 2/2006 |
| JP | 5081200 B2 | 9/2012 |
| WO | WO-2007089797 A2 | 8/2007 |
| WO | WO-2008050467 A1 | 5/2008 |
| WO | WO-2010045884 A1 | 4/2010 |

OTHER PUBLICATIONS

Chinese Application Serial No. 200910140170.9, Response filed Dec. 7, 2012 to Office Action mailed Sep. 27, 2012, w/English claims, 15 pgs.

European Application Serial No. 09164567.1, Partial Search Report mailed Oct. 5, 2012, 6 pgs.

European Application Serial No. 09164567.1, Extended Search Report mailed Jan. 16, 2013, 15 pgs.

European Application Serial No. 09164567.1, Office Action mailed Aug. 28, 2013, 6 pgs.

Japanese Application Serial No. 2012-190926, Office Action mailed Oct. 28, 2013, w/English translation, 6 pgs.

Orozco-Lugo, Aldo G, et al., "Multiple Tone Medium Access Control for Wireless Networks with Multiple Packet Reception and Central Control", Electronics, Robotics and Automotive Mechanics Conference, (Sep. 1, 2007), 56-61.

Ting, Pangan, et al., "Efficient Multiuser MIMO Scheduling Strategies", IEEE 60th Vehicular Technology Conference vol. 2, (Sep. 26, 2004), 2 pgs.

U.S. Appl. No. 12/169,731, Response filed Oct. 11, 2011 to Non Final Office Action mailed Jul. 21, 2011, 13 pgs.

U.S. Appl. No. 12/169,731, Final Office Action mailed Dec. 30, 2011, 17 pgs.

U.S. Appl. No. 12/169,731, Non Final Office Action mailed Jul. 21, 2011, 16 pgs.

U.S. Appl. No. 12/169,731, Notice of Allowance mailed Apr. 13, 2012, 11 pgs.

U.S. Appl. No. 12/169,731, Response filed Mar. 6, 2012 to Final Office Action mailed Dec. 30, 2011, 12 pgs.

Chinese Application Serial No. 200910140170.9, Response filed Apr. 23, 2012 to Office Action mailed Dec. 16, 2011, 11 pgs.

Chinese Application Serial No. 200910140170.9, Office Action mailed Dec. 16, 2011, 18 pgs.

Japanese Application Serial No. P2009-160445, Office Action mailed Oct. 11, 2011, 6 pgs.

Japanese Application Serial No. P2009-160445, Office Action Response Filed Apr. 6, 2012, 18 Pgs.

"AAS Direct Signaling to Support High Capacity MR-BS to RS Links", IEEE Draft; C80216J-07_251R4, IEEE-SA, Piscataway, NJ USA, vol. 802.16j, (May 1, 2007), 1-22.

European Application Serial No. 14177284.8, Extended European Search Report mailed Sep. 3, 2014, 9 pgs.

"RACH Design for EUTRA", Motorola, Retrieved from the Internet: <URL:http://www.3gpp.org> [retrieved on Oct. 26, 2007], (Feb. 13, 2006).

* cited by examiner

UPLINK BANDWIDTH REQUEST PROCESS USING SDMA

DISJOINT PILOT PATTERNS

FAST UPLINK BANDWIDTH REQUEST PROCESS USING SDMA

BASE STATION AND METHOD FOR RESOURCE ALLOCATION IN A 3GPP LTE NETWORK

PRIORITY CLAIM

This application is a continuation of U.S. patent application Ser. No. 12/169,731, filed on Jul. 9, 2008, now issued as U.S. Pat. No. 8,243,690, which is incorporated herein by reference in its entirety.

TECHNICAL FIELD

Some embodiments pertain to bandwidth allocation in wireless access networks. Some embodiments pertain to uplink bandwidth requests and uplink bandwidth request ranging in broadband wireless access networks, such as WiMax networks.

BACKGROUND

In many conventional wireless access networks, bandwidth requests by subscriber stations consume a large amount of overhead and collisions of simultaneously submitted requests cause an increase in latency. Thus, what is needed are apparatus and methods that reduce the amount of overhead for bandwidth requests, and apparatus and methods that reduce the latency caused by collisions of simultaneously submitted bandwidth requests.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments set forth in the claims encompass all available equivalents of those claims.

Figure 1:
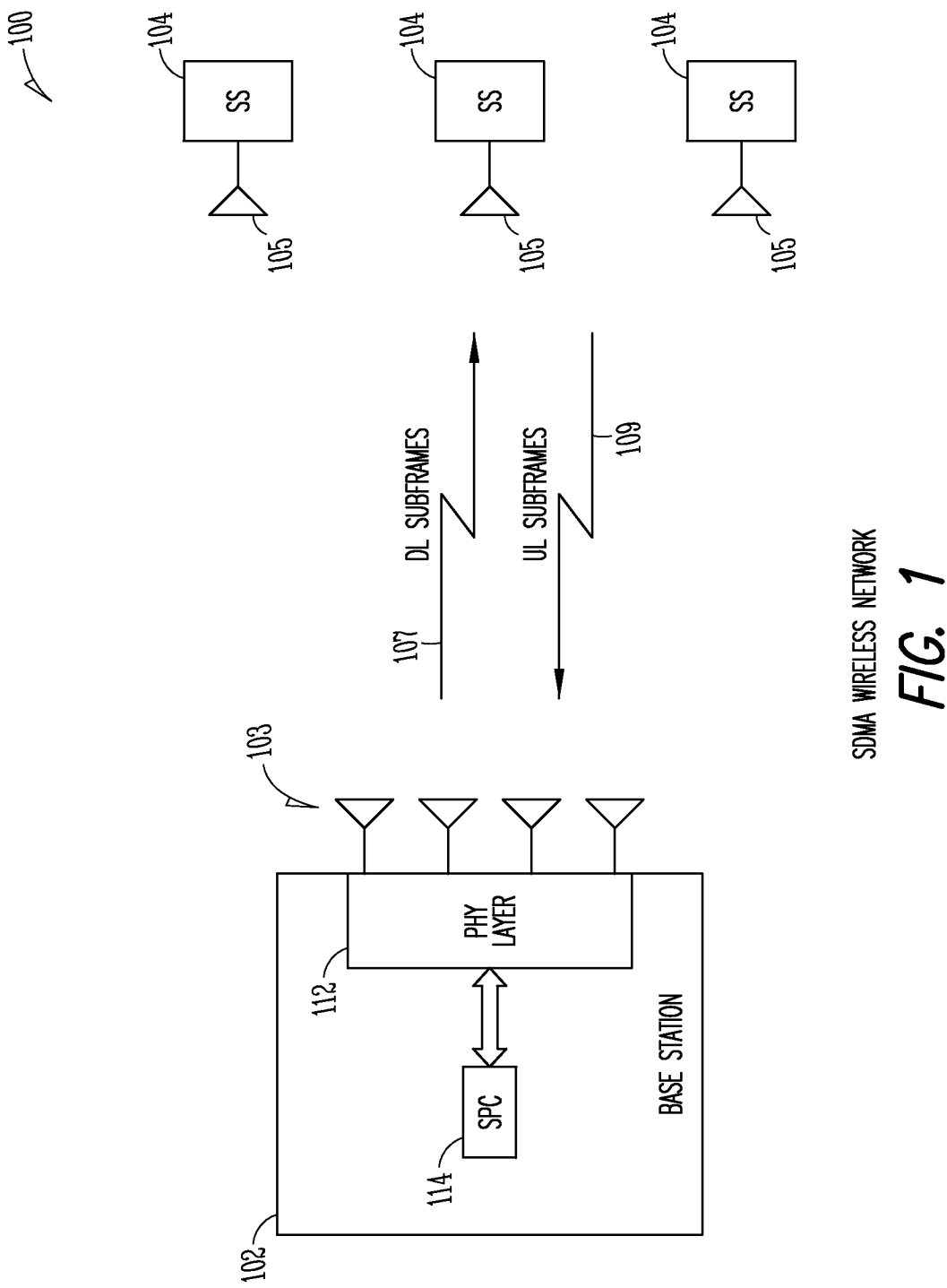
FIG. 1 illustrates a space-division multiple access (SDMA) wireless access network in accordance with some embodiments.

FIG. 1 illustrates a SDMA wireless access network in accordance with some embodiments. Network 100 includes base station 102 and one or more subscriber stations (SS) 104. In multiple-access embodiments, base station 102 communicates with subscriber stations 104 by transmitting within downlink (DL) subframes 107 and subscriber stations 104 communicate with base station 102 by transmitting within uplink (UL) subframes 109. Base station 102 may include one or more maps in downlink subframes 107 to indicate the particular time and frequency resource that each subscriber station 104 may receive information within the current downlink subframe and the particular time and frequency resource that each subscriber station 104 may transmit information within a next uplink subframe.

Base station 102 may include, among other things, physical (PHY) layer circuitry 112 to communicate signals with subscriber stations 104, and signal processing circuitry (SPC) 114 to processes the signals received from subscriber stations 104 and to process signals for transmission to subscriber stations 104. In some embodiments, physical layer circuitry 112 may be configured to receive orthogonal sequences over a bandwidth request contention channel from subscriber stations 104. Signal processing circuitry 114 may detect and/or decode the received signals, as described in more detail below, to allocate uplink bandwidth to subscriber stations 104.

In some embodiments, base station 102 may receive, among other things, the orthogonal sequences from subscriber stations 104 through a plurality of antennas 103 and may use one or more SDMA techniques to help differentiate two or more of the orthogonal sequences that have collided. Accordingly, transmissions of colliding subscriber stations may be detected for allocation of uplink bandwidth. These embodiments are described in more detail below.

In some embodiments, base station 102 and subscriber stations 104 may communicate using a multicarrier communication technique that uses orthogonal frequency division multiplexed (OFDM) communication signals. The OFDM signals may comprise a plurality of orthogonal subcarriers. In some of these multicarrier embodiments, base station 102 may be part of a broadband wireless access (BWA) network communication station, such as a Worldwide Interoperability for Microwave Access (WiMax) communication station, although the scope of the invention is not limited in this respect. Subscriber stations 104 may be BWA network communication stations, such as WiMax subscriber stations, although the scope of the invention is not limited in this respect. In some embodiments, base station 102 and subscriber stations 104 may communicate using a multiple access technique, such as orthogonal frequency division multiple access (OFDMA). Subscriber stations may be almost any portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, base station 102 and subscriber stations 104 may communicate in accordance with specific communication standards, such as the Institute of Electrical and Electronics Engineers (IEEE) standards including the IEEE 802.16-2004 and the IEEE 802.16(e) standards for wireless metropolitan area networks (WMANs) including variations and evolutions thereof, although the scope of the invention is not limited in this respect as they may also be suitable to operate in accordance with other techniques and standards. In some embodiments, base station 102 and subscriber stations 104 may operate in accordance with the provisions of the IEEE 802.16(m) task group. For more information with respect to the IEEE 802.16 standards and task groups, please refer to "IEEE Standards for Information Technology—Telecommunications and Information Exchange between Systems"—Local and Metropolitan Area Networks—Specific Requirements—Part 16: "Air Interface for Fixed Broadband Wireless Access Systems," May 2005 and related amendments/versions. In some embodiments, base station 102 and subscriber stations 104 may communicate in accordance with the 3GPP LTE standards.

Antennas 103 and 105 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some SDMA and multi-user multiple-input, multiple-output (MIMO) embodiments, antennas 103 may be effectively separated to take advantage of spatial diversity and the different channel characteristics that may result between each of antennas 103 and each antenna 105. Although subscriber stations 104 are illustrated with only a single antenna 105, subscriber stations 104 may include more than one antenna.

Figure 2:
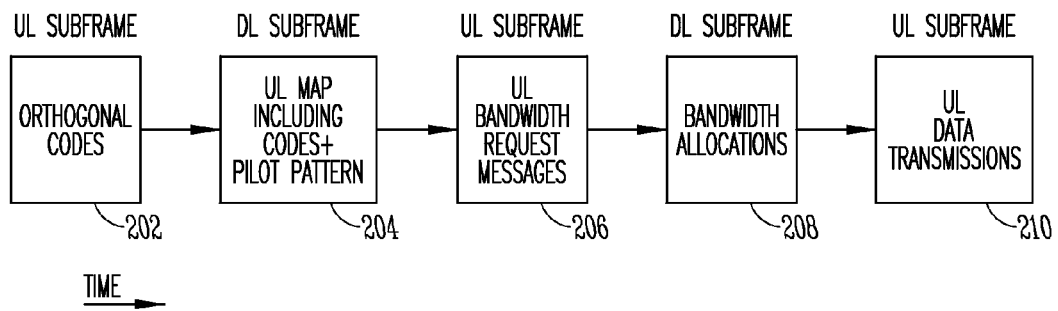
FIG. 2 illustrates uplink and downlink subframes of an uplink bandwidth request process in accordance with some embodiments.

FIG. 2 illustrates uplink and downlink subframes of an uplink bandwidth request process in accordance with some embodiments. Uplink (UL) subframes 202, 206 and 210 may correspond to uplink subframes 109 (FIG. 1), and downlink (DL) subframes 204 and 208 may correspond to downlink subframes 107 (FIG. 1).

In these embodiments, base station 102 (FIG. 1) may receive orthogonal codes from subscriber stations 104 (FIG. 1) in uplink subframe 202 and may broadcast the detected orthogonal codes in downlink subframe 204 to indicate when a detected subscriber station may transmit a request for uplink bandwidth in uplink subframe 206. Base station 102 (FIG. 1) may provide bandwidth allocations to subscriber stations in downlink subframe 208, and subscriber stations 104 (FIG. 1) may transmit uplink data during a portion of uplink subframe 210 as indicated by base station 102 (FIG. 1) in downlink subframe 208. As described in more detail below, base station 102 (FIG. 1) uses SDMA techniques to detect signals received by colliding subscriber stations in uplink subframe 202. Base station 102 (FIG. 1) may also use SDMA techniques to decode uplink bandwidth request messages concurrently received in uplink subframe 206.

Figure 3:
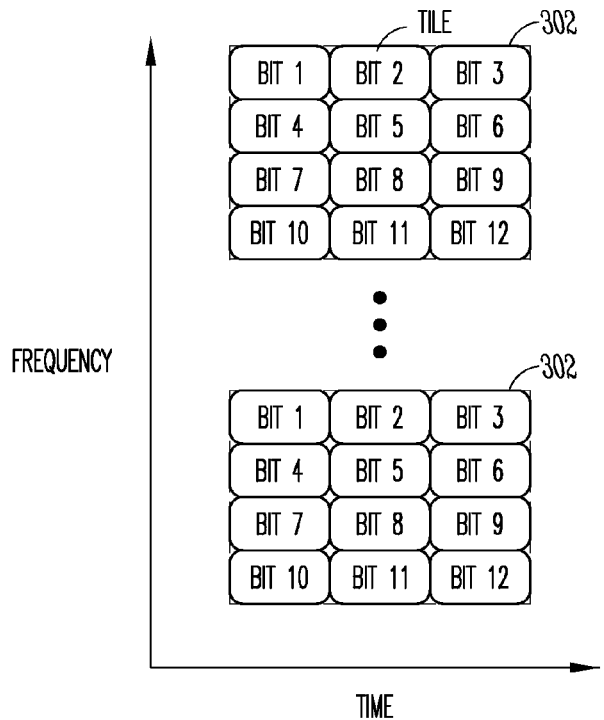
FIG. 3 illustrates tiles of a bandwidth request contention channel in accordance with some embodiments.

FIG. 3 illustrates tiles of a bandwidth request contention channel in accordance with some embodiments. In these embodiments, subscriber stations 104 (FIG. 1) may transmit orthogonal sequences in two or more tiles 302 during uplink subframe 202 (FIG. 2). Each of tiles 302 may comprise a time-frequency block of the bandwidth request contention channel. The two or more tiles utilized by a particular subscriber station may comprise different sets of frequency subcarriers as shown. Base station 102 (FIG. 1) may detect one or more of subscriber stations 104 (FIG. 1) by applying each of a plurality of the orthogonal sequences to the received orthogonal sequences. In these embodiments, base station 102 (FIG. 1) receives the orthogonal sequences from subscriber stations 104 (FIG. 1) through antennas 103 (FIG. 1) and uses an SDMA technique to help differentiate two or more of the orthogonal sequences that may have collided. In these embodiments, subscriber stations 104 (FIG. 1) may transmit their orthogonal sequences in two or more frequency orthogonal tiles 302 over bandwidth request contention channel during uplink subframe 202 (FIG. 2).

As illustrated in FIG. 3, the orthogonal sequence transmitted in each of orthogonal tiles 302 is transmitted by a subscriber station on different frequency subcarriers. In the example of FIG. 3, the first three bits of the orthogonal sequence may be transmitted on one subcarrier, the next three bits may be transmitted on another subcarrier, etc. Although tiles 302 are illustrated for transmission of only twelve bits, the orthogonal sequences generally include many more bits.

Figure 4:
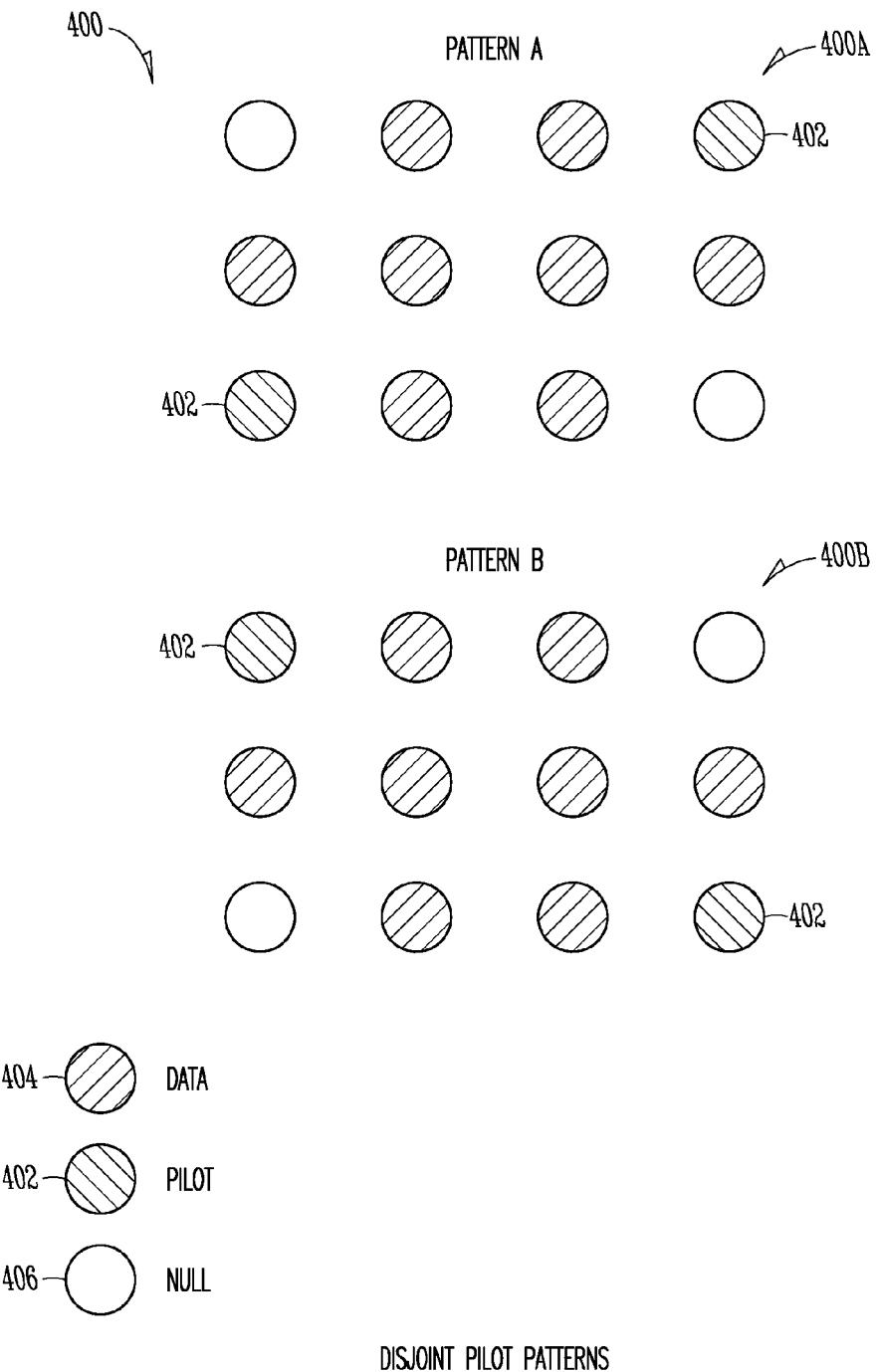
FIG. 4 illustrates disjoint pilot patterns in accordance with some embodiments.

FIG. 4 illustrates disjoint pilot patterns in accordance with some embodiments. In some embodiments, base station 102 (FIG. 1) may broadcast a schedule in downlink subframe 204 (FIG. 2) which includes the detected orthogonal codes and an assignment of one of a plurality disjoint pilot patterns 400 to each detected subscriber station 104 (FIG. 1). Each disjoint pilot pattern 400 may be used for subsequent transmission by a detected subscriber station 104 (FIG. 1) of an uplink bandwidth request message in uplink subframe 206 (FIG. 2). Disjoint pilot patterns 400 may comprise orthogonal (i.e., non-overlapping) pilot subcarriers 402 and non-orthogonal (i.e., overlapping) data subcarriers 404. Thus, each pilot subcarrier 402 of disjoint pilot pattern 400A may have a null subcarrier 406 in a corresponding location of disjoint pilot pattern 400B, and each pilot subcarrier 402 of disjoint pilot pattern 400B may have a null subcarrier 406 in a corresponding location of disjoint pilot pattern 400A. Accordingly, orthogonal sequences transmitted on pilot subcarriers 402 of one of disjoint pilot patterns 400 may be used to help determine the channel response for the transmitting subscriber station as well as to help identify the subscriber station. Accordingly, the use of SDMA processing techniques by base station 102 (FIG. 1) allows subscriber stations 104 (FIG. 1) to submit requests for uplink bandwidth simultaneously using the same frequency data subcarriers.

In some embodiments, at least some of subscriber stations 104 (FIG. 1) use non-orthogonal data subcarriers 404 for transmission of the uplink bandwidth request messages in next uplink subframe 206 (FIG. 2). Base station 102 (FIG. 1) may receive the uplink bandwidth request messages in next uplink subframe 206 (FIG. 2) from two or more of the subscriber stations may use SDMA techniques to separate the uplink bandwidth request messages sent by the two or more subscriber stations 104 (FIG. 1) on the same data subcarriers 404. In these embodiments, uplink bandwidth request messages may be sent using different of disjoint pilot patterns 400. Although FIG. 4 illustrates only two disjoint pilot patterns 400, embodiments may use more than the two disjoint pilot patterns that are illustrated.

In some embodiments, each subscriber station 104 (FIG. 1) may transmit an orthogonal sequence in uplink subframe 202 (FIG. 2) and may transmit an uplink bandwidth request message in uplink subframe 206 (FIG. 2) using one antenna 105 (FIG. 1), although this is not a requirement. Base station 102 (FIG. 1), on the other hand, receives the uplink bandwidth request messages with two or more of antennas 103 (FIG. 1) so that SDMA techniques may be utilized.

Referring to FIGS. 1-4, in some embodiments, the orthogonal sequences may be randomly selected by subscriber stations 104 prior to their transmission in uplink subframe 202. In these embodiments, subscriber stations 104 transmit the randomly selected orthogonal sequences in two or more tiles 302 during uplink subframe 202 to initiate a request for uplink bandwidth. In these embodiments, subscriber stations 104 may refrain from transmitting non-orthogonal codes or partially orthogonal codes, such as code-division multiple access (CDMA) codes, to base station 102 over the bandwidth request contention channel to initiate a request for uplink bandwidth. In a conventional WiMax network, bandwidth requests by subscriber stations include non-orthogonal codes or partially orthogonal codes, such as CDMA codes, modulated on a significant portion of subcarriers of one OFDM symbol.

In these embodiments, each subscriber station 104 may select two or more non-overlapping tiles 302 for transmission of an orthogonal sequence on the bandwidth request contention channel. The tiles may be randomly selected and a subscriber station 104 may end up selecting tiles that partially or fully overlap with the tiles selected by other subscriber stations. The use of SDMA techniques by base station 102 helps the different orthogonal codes to be detected.

Since the use of SDMA augments the channel bandwidth for the requests, the collision rate and delay are reduced. The use of SDMA also magnifies network throughput using augmented spatial channels, which are formed by antennas 105 of subscriber stations 104 and antennas 103 of base station 102. In accordance with embodiments, SDMA, when is utilized for bandwidth requests, allows two or more subscriber stations 104 to transmit simultaneously. In contrast, when a collision occurs in conventional bandwidth request schemes, neither of the subscriber stations are detected.

In a conventional bandwidth request scheme, CDMA codes are used to help differentiate subscriber stations. In accordance with some embodiments, these CDMA codes are replaced by a set of orthogonal sequences $b_i$ for i=1, ..., M, where $$b_j^H b_i = \begin{cases} M, & \text{for } i = j \\ 0, & \text{for } i \neq j. \end{cases}$$

Any frequency offset may be corrected using downlink common pilot or preamble and the time offset is bounded by periodical ranging. Furthermore, the orthogonal sequence may be sent in multiple tiles 302. Each tile 302 is a time-frequency resource block and may comprise subcarriers adjacent in time and frequency. The orthogonal sequence transmitted in each of the tiles 302 may be the same, although different sequences may be used. The channel response over an entire tile 302 varies little and is treated as constant over that tile.

In some embodiments, each subscriber station 104 randomly selects one out of the M sequences and transmits the selected sequence on the bandwidth request contention channel that are formed by tiles 302. In some example embodiments, base station 102 may use four receive antennas 103 to receive sequences from two subscriber stations 104 that each use one transmit antenna 105. The received signal in tile 't' can be modeled as $$\underbrace{\begin{bmatrix} y_{1,1}(t) & \cdots & y_{1,M}(t) \\ \vdots & & \vdots \\ y_{4,1}(t) & \cdots & y_{4,M}(t) \end{bmatrix}}_{Y(t)} = \underbrace{\begin{bmatrix} h_{1,1}(t) & h_{1,2}(t) \\ \vdots & \vdots \\ h_{4,1}(t) & h_{4,1}(t) \end{bmatrix}}_{H(t)} \underbrace{\begin{bmatrix} b_{1,1} & \cdots & b_{1,M} \\ b_{2,1} & \cdots & b_{2,M} \end{bmatrix}}_{B} + \underbrace{\begin{bmatrix} n_{1,1}(t) & \cdots & n_{1,M}(t) \\ \vdots & & \vdots \\ n_{4,1}(t) & \cdots & n_{4,M}(t) \end{bmatrix}}_{N(t)} \quad (1)$$

where $y_{i_a,i_t}(t)$ represents the received signal at a base station antenna $i_a$ at time $i_t$; $h_{i_a,j_a}(t)$ represents the channel response from subscriber $j_a$'s transmit antenna to the base station antenna $i_a$ and is assumed to be constant over the tile; $b_i = [b_{i,1} \ldots b_{i,M}]$ represents the orthogonal sequence sent by subscriber i; and $n_{i_a,i_t}(t)$ represents the additive white Gaussian noise (AWGN) noise at the base station antenna $i_a$ at time $i_t$. The two transmitted sequences may be detected in accordance with:

$$[\hat{b}_1, \hat{b}_2] = \underset{\tilde{B}, \tilde{b}_1, \tilde{b}_2 \in \{b_i, i=1, \ldots, M\}}{\operatorname{argmax}} \sum_t \|Y(t)\tilde{B}^H\|_1, \quad (2)$$

where $$\|A\|_1 = \sum_{i,j} |a_{i,j}|.$$

The original channel H(t) may be treated as the transmitted data and the original data B as the channel carrying the virtual data H(t). All possible sequences $\tilde{B}$s may be tried to match against the received signals Y(t). The sequence with the best fit may be selected. The noise term N(t) is not amplified in Equation (2) because $\tilde{B}$ consists of unit vectors. Furthermore, Equation (2) may be used to detect subscriber stations 104 even when two subscriber stations 104 transmit the same sequences because the use of SDMA can differentiate the two subscriber stations 104 based on the difference of their spatial channels.

After subscriber stations 104 are detected, base station 102 may schedule the actual submission of the bandwidth request and broadcast the schedule in downlink subframe 204. The bandwidth request submitted by subscriber stations 104 in uplink subframe 206 may be submitted using SDMA. In these embodiments, the SDMA processing techniques are extended for bandwidth requests and base station 102 may allocate time-frequency subchannels for two or more detected subscriber stations 104 to transmit on the same subchannels and may assign two disjoint pilot patterns 400A and 400B to the two detected subscriber stations 104 so that base station 102 may estimate the channel responses from each of the two subscriber stations 104. In these embodiments, base station 102 may assign a different one of disjoint pilot patterns 400 to the two detected subscriber stations 104. The two detected subscriber stations 104 may submit their bandwidth requests over the same subchannels in uplink subframe 206.

Figure 5:
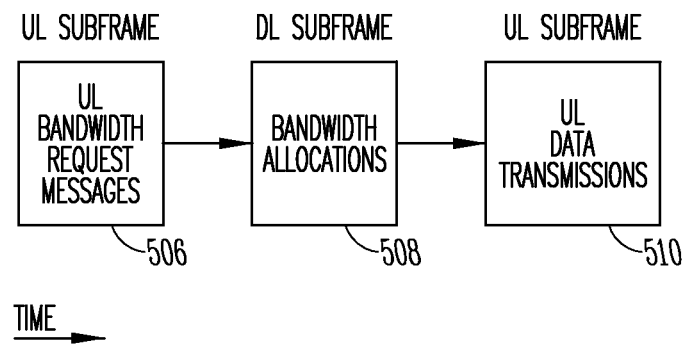
FIG. 5 illustrates uplink and downlink subframes of an uplink bandwidth request process in accordance with some alternate embodiments.

FIG. 5 illustrates uplink and downlink subframes of an uplink bandwidth request process in accordance with some alternate embodiments. Uplink (UL) subframes 506 and 510 may correspond to uplink subframes 109 (FIG. 1), and downlink (DL) subframe 508 may correspond to one of downlink subframes 107 (FIG. 1).

In these embodiments, uplink bandwidth request messages may be received on the bandwidth request contention channel from one or more subscriber stations 104 (FIG. 1) in uplink subframe 506. The uplink bandwidth request messages may be generated by subscriber stations 104 (FIG. 1) by modulating pilot subcarriers of a randomly selected disjoint pilot pattern 400 (FIG. 4) with a randomly selected orthogonal sequence. Allocations of uplink bandwidth may be provided to subscriber stations 104 (FIG. 1) in downlink subframe 508 when the uplink bandwidth request messages are successfully detected and decoded. In these embodiments, the first three steps of the uplink bandwidth request process of FIG. 2 are combined and thus, bandwidth can be allocated quicker, with less bandwidth consumption, and with reduced latency.

In these embodiments, base station 102 (FIG. 1) may receive the uplink bandwidth request messages through two or more antennas 103 (FIG. 1) and may apply SDMA techniques to determine channel responses based on the orthogonal sequences to detect and decode the uplink bandwidth request messages. In these embodiments, the uplink bandwidth request messages may be received on the bandwidth request contention channel in uplink subframe 506.

In these embodiments, subscriber stations 104 (FIG. 1) may randomly select one of a plurality of disjoint pilot patterns, such as one of disjoint pilot patterns 400 (FIG. 4), and one of a plurality of orthogonal sequences prior to transmitting the uplink bandwidth request messages. Data subcarriers 404 (FIG. 4) may be modulated by subscriber stations 104 (FIG. 1) with an uplink bandwidth request data element. In these embodiments, base station 102 (FIG. 1) may determine a channel response for each subscriber station 104 (FIG. 1) by applying each of the orthogonal sequences of the plurality to signals received on the pilot subcarriers of disjoint pilot patterns 400 (FIG. 4).

Referring to FIGS. 1 and 3-5, in some embodiments, when a single uplink bandwidth request is received from one subscriber station 104 in uplink subframe 506, base station 102 may detect the uplink bandwidth request using maximum ratio combining (MRC) and may allocate uplink bandwidth for an uplink data transmission in next downlink subframe 508 to the one detected subscriber station.

When two colliding uplink bandwidth requests are received from two subscriber stations 104 over the bandwidth request contention channel and when the two subscriber stations have randomly selected different disjoint pilot patterns and different orthogonal sequences, base station 102 may detect and decode the uplink bandwidth requests using a spatial demultiplexing technique. Base station 102 may indicate an allocation of uplink bandwidth for an uplink data transmission to each of the detected subscriber stations 104 in next downlink subframe 508. Thus, in these embodiments, uplink bandwidth can be allocated in a two-step process, unlike convention processes using CDMA codes that require four or more steps. In these embodiments, the spatial demultiplexing technique may include either a minimum mean square error (MMSE) estimation technique or a zero-forcing technique, although the scope of the embodiments is not limited in this respect.

In some embodiments, when two colliding uplink bandwidth requests are received from two subscriber stations over the bandwidth request contention channel and when the two subscriber stations have randomly selected the same disjoint pilot pattern and different orthogonal sequences, base station 102 may attempt to detect and decode at least one of the uplink bandwidth requests (e.g., with a higher error rate) using a spatial demultiplexing technique (e.g., MMSE or zero forcing). Base station 102 may also allocate uplink bandwidth for an uplink data transmission to at least one of the subscriber stations when at least one subscriber station was successfully detected. In these embodiments, the colliding uplink bandwidth request messages may be received on the bandwidth request contention channel in uplink subframe 506.

In some embodiments, when two colliding uplink bandwidth requests are received from two subscriber stations 104 over the bandwidth request contention channel and when the two subscriber stations 104 have selected the same disjoint pilot pattern and the same orthogonal sequences, base station 102 may refrain from allocating bandwidth for an uplink data transmission to either of the two subscriber stations 104 when the uplink bandwidth requests are unable to be detected and/or decoded. In these embodiments, the base station 102 may be unable to detect either of the uplink bandwidth requests received on the bandwidth request contention channel in uplink subframe 506 since the two subscriber stations 104 have selected the same disjoint pilot pattern and the same orthogonal sequences. Accordingly, base station 102 is unable to provide a bandwidth allocation in next downlink subframe 508. Furthermore, since neither subscriber station 104 has been detected, the base station 102 is unable to broadcast a detected sequence to allocate a transmission resource to a subscriber station 104 for submission of a contention-free uplink bandwidth request, as in the uplink bandwidth request process of FIG. 2.

In some embodiments, subscriber stations 104 may randomly select one of two disjoint pilot patterns 400 and one of two orthogonal sequences for transmission of uplink bandwidth request messages. When more than two colliding uplink bandwidth requests are received from more than two subscriber stations 104 over the bandwidth request contention channel, base station 102 may attempt to detect one or more of the orthogonal sequences and the pilot patterns to detect one or more subscriber stations 104. Base station 102 may also broadcast in a downlink subframe, such as downlink subframe 204 (FIG. 2), the one or more detected orthogonal sequences and pilot patterns to allocate a transmission resource for each detected subscriber station 104. The transmission resource is to be used by the detected subscriber stations 104 to retransmit a contention-free bandwidth request message. In these embodiments, base station 102 may only be able to detect one or more subscriber stations 104, but is likely to be unable to decode the uplink bandwidth request messages. Thus, the detected subscriber stations 104 may be allocated a transmission resource to retransmit an uplink bandwidth request message in a next uplink subframe.

In some embodiments, each subscriber station 104 may include PHY layer circuitry and signal processing circuitry to perform the operations described herein. In these embodiments, the signal processing circuitry may randomly select one of disjoint pilot patterns 400 and one the orthogonal sequences. The PHY layer circuitry may be configured to transmit an uplink bandwidth request message on the bandwidth request contention channel. The PHY layer circuitry may generate the uplink bandwidth request messages by modulating pilot subcarriers of the randomly selected disjoint pilot pattern 400 with the randomly selected orthogonal sequence.

Although base station 102 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of base station 102 may refer to one or more processes operating on one or more processing elements.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A resource allocation method performed by a base station for allocating resources to mobile stations, wherein the base station and the mobile station communicate in accordance with one of third generation partnership project Long Term Evolution (3GPP LTE) standards, the method comprising:
   receiving scheduling requests within resource elements of an uplink channel, the requests indicating a need for the mobile station to be scheduled, the requests being received through a plurality of antennas and detected using a diversity combining process, wherein at least two of the received scheduling requests are included in adjacent resource elements; and
   transmitting a resource allocation to the mobile station by providing a mapping on a downlink channel that indicates resources allocated,
   wherein the uplink channel is one of either a contention channel and a non-contention channel, and
   wherein when the request is received on a non-contention channel, the request is received within an assigned resource configured with an orthogonal sequence.

2. The method of claim 1 wherein the scheduling requests comprise requests for bandwidth allocation.

3. The method of claim 1 wherein the scheduling requests are configured in accordance with an orthogonal sequence for an antenna.

4. The method of claim 3 wherein the scheduling request includes a cyclic-time shift of a base reference sequence modulated with time-domain orthogonal block spreading.

5. The method of claim 1 wherein when the requests are received on a contention channel, the method includes using a space-division multiple access (SDMA) technique to help differentiate the requests.

6. The method of claim 1 further comprising receiving uplink data on the assigned resources using a plurality of antennas.

7. The method of claim 1, wherein the diversity combining process comprises a maximum ratio combining (MRC) process.

8. A base station configured to communicate with mobile stations in accordance with one of third generation partnership project Long Term Evolution (3GPP LTE) standards, the base station comprising:
   physical layer circuitry to receive scheduling requests within resource elements of an uplink channel, the requests indicating a need for a mobile station to be scheduled, wherein the requests are received through a plurality of antennas and detected using a diversity combining process, wherein at least two of the received scheduling requests are to be included in adjacent resource elements; and
   processing circuitry to determine a resource allocation for the mobile station and generate a mapping,
   wherein the physical layer circuitry is to transmit the mapping on a downlink that indicates resources allocated,
   wherein when the request is received on a non-contention channel, the request is received within an assigned resource configured with an orthogonal sequence.

9. The base station of claim 8 wherein the scheduling requests comprise requests for bandwidth allocation.

10. The base station of claim 8 wherein the scheduling requests are configured in accordance with an orthogonal sequence for an antenna.

11. The base station of claim 10 wherein the scheduling request includes a cyclic-time shift of a base reference sequence modulated with time-domain orthogonal block spreading.

12. The base station of claim 8 wherein the uplink channel is either a contention channel or a non-contention channel.

13. The base station of claim 12 wherein when the requests are received on a contention channel, the processing circuitry is arranged to use a space-division multiple access (SDMA) technique to help differentiate the requests.

14. The base station of claim 8 wherein the physical layer circuitry is configured to receive uplink data on the assigned resources using a plurality of antennas.

15. The base station of claim 8, wherein the diversity combining process comprises a maximum ratio combining (MRC) process.

16. Signal processing circuitry comprising:
   circuitry configured to process scheduling requests that are received within resource elements of an uplink channel, the requests indicating a need for a mobile station to be scheduled, the requests being received through a plurality of antennas and detected using a diversity combining process, wherein at least two of the received scheduling requests are to be included in adjacent resource elements; and
   circuitry configured to determine a resource allocation for the mobile station and to generate a mapping for transmission on a downlink to indicate resources allocated to the mobile station,
   wherein when the request is received on a non-contention channel, the request is received within an assigned resource configured with an orthogonal sequence for an antenna, and
   wherein the uplink channel is either a contention channel or a non-contention channel.

17. The signal processing circuitry of claim 16 wherein the uplink channel is one of either a contention channel and a non-contention channel, and
   wherein when the requests are received on a contention channel, the signal processing circuitry is configured to use a space-division multiple access (SDMA) technique to help differentiate the requests.

18. The signal processing circuitry of claim 16 wherein the signal processing circuitry is part of a base station that communications with the mobile station communicate in accordance with one of third generation partnership project Long Term Evolution (3GPP LTE) standards.

19. The signal processing circuitry of claim 16, wherein the diversity combining process comprises a maximum ratio combining (MRC) process.

* * * * *